March 7, 1967     T. I. KIRKPATRICK     3,308,349
MAGNETIC FIELD STABILIZATION
Filed March 13, 1964     2 Sheets-Sheet 1
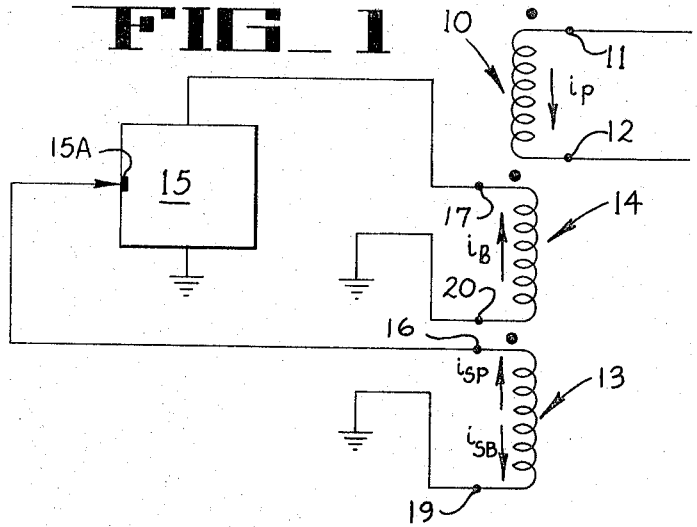
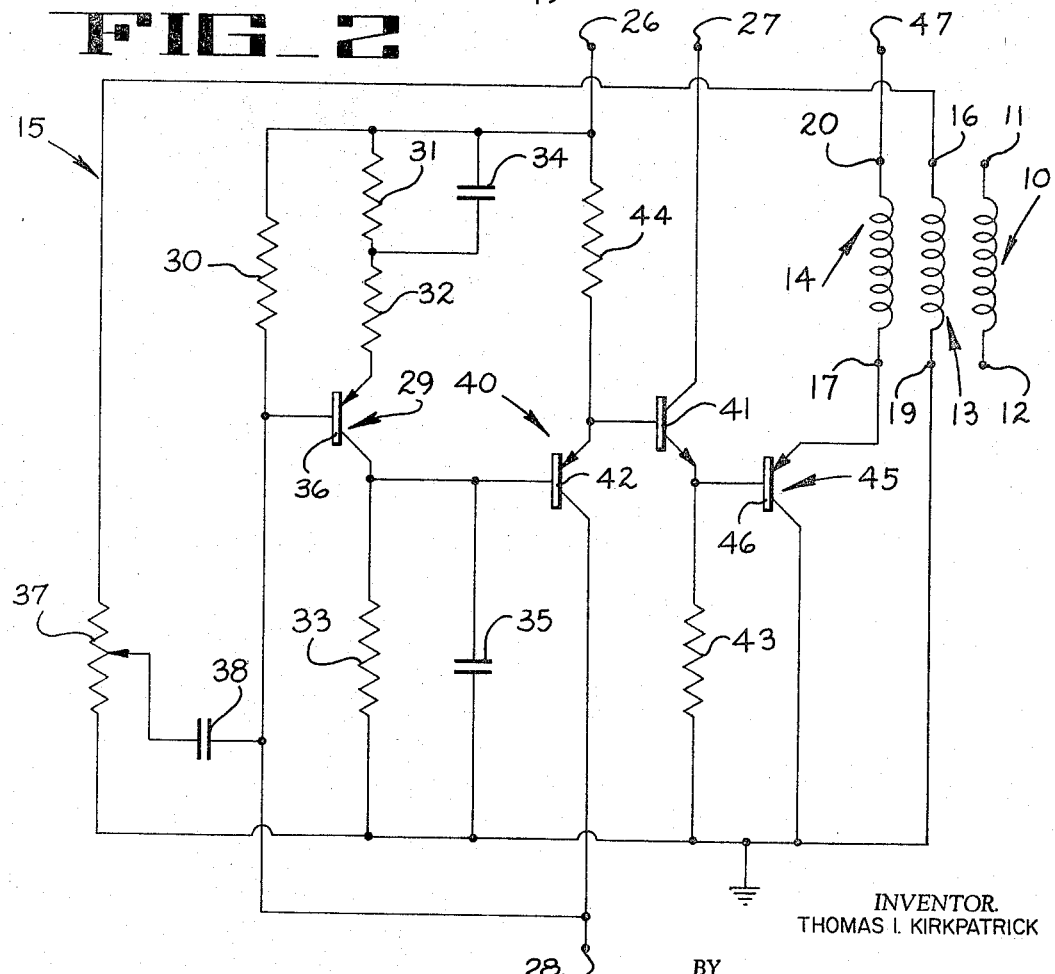
INVENTOR.
THOMAS I. KIRKPATRICK
BY
*Robert R. Thornton*

March 7, 1967
T. I. KIRKPATRICK
3,308,349
MAGNETIC FIELD STABILIZATION
Filed March 13, 1964
2 Sheets-Sheet 2
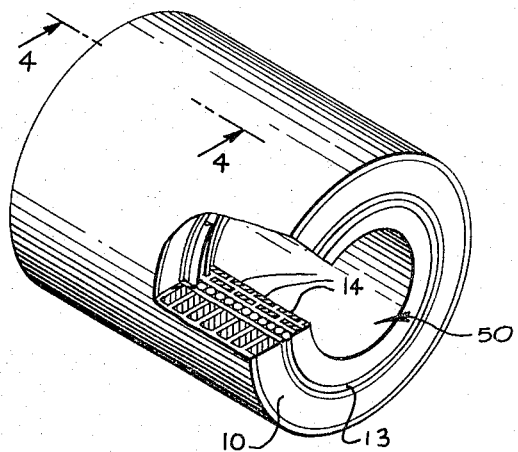
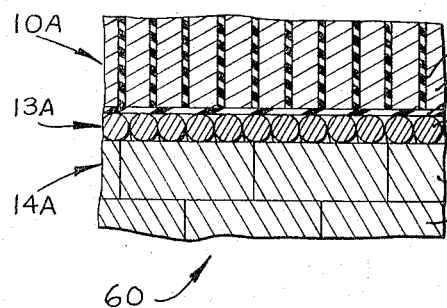
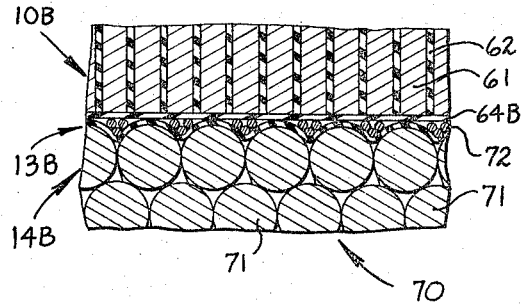
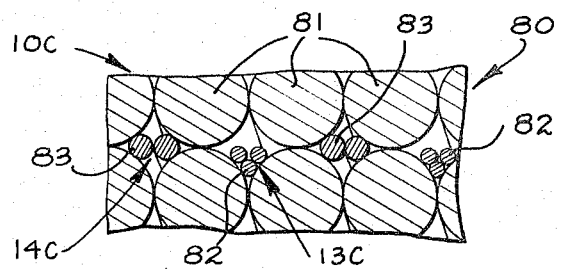
INVENTOR.
THOMAS I. KIRKPATRICK
BY *Robert R Thornton*

United States Patent Office 3,308,349
Patented Mar. 7, 1967

3,308,349
MAGNETIC FIELD STABILIZATION
Thomas I. Kirkpatrick, Santa Cruz County, Calif., assignor to The Regents of the University of California, Berkeley, Calif.
Filed Mar. 13, 1964, Ser. No. 351,769
13 Claims. (Cl. 317—123)

equivalents is from about 0.075 to about 0. .

This invention relates to the regulation of magnetic fields, and more particularly to field stabilization of an air core magnet.

As large magnets have come into widespread use, the stabilization of the fields produced by such magnets has become of increasing importance. The fields of such magnets are conventionally stabilized by means such as passive eddy current shields, inductance-capacitance filtering, or magnetic amplifier regulators. However, in large magnets, as the frequency of the variation in the electrical current causing the field change approaches zero frequency, such conventional regulation become impractical. Frequencies in this range, for example, may result from armature end play in the motor generator supply source or by induction motor slip causing a beating with sixty-cycle line current. Similarly, in magnetic amplifier supplies, the line voltage variations resulting from the sudden application of heavy loads may give rise to such frequencies. For these frequencies, the use of passive eddy current shielding is impractical because the thickness of metal required in order to be effective becomes prohibitive. Passive inductance-capacitance filtering becomes extremely expensive to extend to this frequency range. Magnetic amplifier regulators are unable to respond with sufficient rapidity to provide effective stabilization.

According to the invention, stabilization of a magnetic field is accomplished by the combination of a sensing winding and a bucking winding, each being closely coupled to the other and to a primary magnetic field, which field constitutes the major portion of the magnetic field to be stabilized. The remainder of the stabilized magnetic field is produced by current flow through the bucking winding. Current flow through the bucking winding produces a bucking winding magnetic field which combines with the primary magnetic field to produce the stabilized field. Bucking winding current flow is controlled by an error signal induced in the sensing winding in response to a change in the primary magnetic field. By means of the coupling between the bucking winding and the sensing winding, bucking winding current flow induces a negative feedback correction signal in the sensing winding to oppose the error signal. A change in the strength of the primary magnetic field induces an error signal in the sensing winding, controlling current flow in the bucking winding to produce a complementary change in the bucking winding magnetic field, such that the total magnetic field tends to remain constant.

The invention may be more readily understood by referring to the accompanying drawing in which:

FIGURE 1 is a block diagram illustrating a magnetic field stabilizing device according to the invention;

FIGURE 2 is a schematic diagram of a circuit for a magnetic field stabilizing device according to the invention;

FIGURE 3 is a view, in section, illustrative of the relative disposition of the windings of an air core solenoid for use in the present invention;

FIGURE 4 is a partial sectional view, in detail, of the relative disposition of primary, sensing, and bucking windings for an embodiment of the solenoid of FIGURE 3;

FIGURE 5 is a partial sectional view, in detail, of the relative disposition of the primary, sensing, and bucking windings for an alternate embodiment of the solenoid of FIGURE 3; and FIGURE 6 is a partial sectional view, in detail, of the relative disposition of the primary, sensing, and bucking windings for another alternate embodiment of the solenoid of FIGURE 3.

Referring now to FIGURE 1, there is shown a block diagram of a magnetic field stabilizer 9 according to the invention. In FIGURE 1, a primary winding 10 has an energizing potential (not shown) applied thereto across a pair of input terminals 11 and 12. The application of the energizing potential to the primary winding 10 causes a current $I_P$ to flow through the winding 10, producing a primary magnetic field constituting at least the major portion of the magnetic field whose magnitude is to be stabilized. Any change, $i_P$, in the current $I_P$, flowing through the primary winding 10 causes a change in the magnetic field surrounding the winding 10, which change is a function of $i_P$.

A sensing winding 13 and a bucking winding 14 are closely coupled to the primary winding 10 and to each other. An amplifier 15 has its input 15A connected to a terminal 16 of the sensing winding. The bucking winding 14 has a terminal 17 to which the output of the amplifier 15 is applied. The sensing winding 13 and bucking winding 14 are connected to ground through terminals 19 and 20 respectively. The sensing winding 13 is sensitive to any change in the magnetic field, as compared to the bucking winding 14; that is, a current $i_{SP}$, which is induced in the sensing winding 13 by a magnetic field variation resulting from a given $i_P$ in the primary winding 10, is large with respect to the current induced in the bucking winding 14 by such magnetic field variation.

In the preferred embodiment, the amplifier 15 is normally conducting so that a current $I_B$ normally flows through the bucking winding 14 when the amplifier 15 is in its quiescent state. The total magnetic field of the device of FIGURE 1 is, therefore, determined by the algebraic sum of the magnetic fields resulting from current flow through the primary winding 10 and the bucking winding 14, the flux resulting from the current $i_{SP}$ being negligible in this respect.

In the preferred embodiment, the bucking winding field produced by the quiescent state conduction of the amplifier 15 augments the primary magnetic field, although, if desired, the quiescent state bucking field could oppose the primary magnetic field. Also, while a single-ended amplifier is shown, a push-pull amplifier and bucking winding circuit can be used, if it is desired to eliminate the conduction of the amplifier as when the magnetic field is normally sufficiently stable, for example. The application to the amplifier input 15A of a control signal, the value of which is a function of the current $i_{SP}$ induced in the sensing winding 13, changes the magnitude of the current conduction in the output of the amplifier 15, and thus, changes the magnitude of the current flowing through the bucking winding 14. This change, $i_B$, in the magnitude of the current flow through the bucking winding 14 produces a change in the total magnetic field of the device 9 which, as is shown by the dot notation, is opposed to the change in the total magnetic field resulting from the change, $i_P$, in the current flow in the primary winding 10. Since the bucking winding 14 and sensing winding 13 are closely coupled, the change in the bucking winding magnetic field produced by the current flow change, $i_B$, in the bucking winding 14 induces a current, $i_{SB}$, in the sensing winding 13 which is opposed to the current $i_{SP}$ induced in the sensing winding 13 as a result of $i_P$. Thus, a negative feedback is applied to the amplifier input 15A, since the algebraic summation of $i_{SP}$ and $i_{SB}$ produces a reduced control signal input to the amplifier 15 for a given $i_P$.

If the magnitude of the current $i_{SB}$ equals the magnitude of the current $i_{SP}$, the overall current flow through the sensing winding 13 is zero. The amplifier 15 then receives a zero input signal. The corrective curent $i_B$ becomes zero, and the current flow through the bucking winding 14 is $I_B$, the current resulting from the quiescent operation of the amplifier 15. However, if $i_B$ is zero, $i_{SP}$ must also be zero, indicating that the current change, $i_P$, in the primary winding 10 has become zero, so that there is no change in current flow through the primary winding 10, and the magnetic field is stabilized. Conversely, whenever $i_P$ is not zero, a stabilizing current $i_B$ flows in the bucking winding 14, producing a change in the bucking winding magnetic field complementary to the change in the primary magnetic field.

The utilization of negative feedback around the amplifier 15 is an essential element of the present invention. The negative feedback serves two purposes: to extend the frequency response of the device to both low and high frequency field variations; and to increase the accuracy of stabilization by damping any over-correction or oscillation in correction. The negative feedback is applied by closely coupling the sensing winding 13 and the bucking winding 14, and connecting the windings so that a current flow $i_B$ in the bucking winding 14 induces a current $i_{SB}$ in the sensing winding which opposes the current $i_{SP}$ induced therein.

In FIGURE 2, there is shown a schematic diagram of a circuit suitable for use in the invention. In FIGURE 2, a terminal 26 has a positive twenty-four volt potential applied thereto; a terminal 27, a positive eighteen volt potential; and a terminal 28, a positive six-volt potential. A first transistor stage 29 includes resistors 30, 31, 32, 33 and capacitors 34 and 35, together with a transistor 36. The first transistor stage 29 provides voltage gain for an input signal. This input signal is the control signal which is a function of $i_{SP}$, and is developed across a potentiometer 37 and applied to the transistor 36 through the potentiometer arm and a coupling capacitor 38. It will be noted that the potentiometer 37 is connected between the sensing winding terminal 16 and ground, so that the current induced in the sensing winding 13 appears as a voltage drop across the potentiometer 37. The combination of the capacitor 35, together with resistor 33, provides high frequency roll-off of the amplifier response, so as to avoid oscillation which would otherwise occur due to the great amount of negative feedback utilized in the circuit.

A second transistor stage 40 includes transistors 41 and 42 together with associated resistors 43 and 44. The transistors 41, 42 are connected in series as emitter-followers, in order to provide load impedance matching between the first transistor stage 29 and an output circuit 45. The output circuit 45 includes a transistor stage 46, which is shown as connected between the bucking winding terminal 17 and ground. A positive fifteen-volt supply voltage for the transistor stage 46 is applied to the bucking winding 14 at terminal 47. The bucking winding 14 provides the output load for the transistor stage 46. If desired, current limiter means (not shown) may be utilized in conjunction with the fifteen-volt supply applied to the terminal 47 in order to avoid damage to the transistor stage 46 in the event that a short circuit should develop in the bucking winding 14.

Typical values for the components of the circuit of FIGURE 2 are as follows:

Resistors and potentiometers:
    30—2,200 ohms, 1 watt
    31—4,700 ohms, 1 watt
    32—100 ohms, 1 watt
    33—10,000 ohms, 1 watt
    44—560 ohms, 1 watt
    43—120 ohms, 10 watts
    37—10,000 ohms, 1 watt Capacitors:
    34—50 microfarads, 50 volts
    38—50 microfarads, 50 volts
    35—0.001 microfarad, 100 volts Transistors:
    29—Type 2N484
    41—Type 2N679
    42—Type 2N368
    46—Type 2N553 (three transistors, parallel connected)

Windings:
    13—Resistance, 32 ohms; Inductance, 16 millihenries
    14—Resistance, 0.33 ohms; Inductance, 4 millihenries
    10—Resistance, 0.025 ohms; Inductance, 1 millihenery The electrical characteristics given above for the windings 10, 13, 14 are the characteristics of a three-winding air-core transformer (see FIGURE 4), in which the primary winding is a Bitter solenoid of two hundred fifty turns, the sensing winding consists of eight hundred eighty turns of #32 copper wire, the bucking winding consists of two hundred twenty turns, in four layers, of a 1.9 x 4.2 centimeter copper strap, the magnet has a bore of four inches and a length of fifty centimeters, the magnet field is fifty kilogauss, and the primary winding current variation, $i_P$, is less than 0.1 percent R.M.S. Amplifier low frequency response extends to less than one cycle per second, as a result of closing the feedback loop through the close coupling between the sensing winding 13 and bucking winding 14. Coupling between the windings 10, 13, 14 is preferably substantially unity. With the operating and component values given, the quiescent current flow, $I_B$, through the bucking winding 14 is approximately six amperes, providing a range for the bucking winding current flow change $i_B$, of from zero to twelve amperes. The current flow, $i_B$, through the bucking winding 14 reduces the total magnetic field variation by a factor of one hundred.

It will be noted that the transistors used are high speed transistors, rather than audio frequency transistors. While it might appear that transistors with $\beta$ cut off characteristics of about ten kilocycles could be utilized to provide satisfactory stabilization, such is not generally the case. Unsatisfactory operation with such transistors results from the combination of the large amount of negative feedback applied and the time delay inherent in the circuit as a result of the propagation delay times of the transistors. The time delay resulting from propagation delay times acts as a high frequency phase shift. If the amplifier gain is not reduced to less than unity by the time the total effective phase shift reaches 180 degrees; the ordinarily negative feedback becomes a positive feedback, and oscillation results. By utilizing high speed transistors, an overall time delay of about four microseconds, neglecting the high frequency roll-off, is achieved in the circuit of FIGURE 2, for a step function input to the amplifier. Low frequency phase shift problems are avoided by the use of D.C. coupling between the amplifier stages. Of course, while the use of transistors is preferable, it is to be understood that vacuum tube amplification can also be utilized in the practice of the invention.

Referring now to FIGURE 3, there is shown in cross-section an idealized configuration of an air core magnet or solenoid for use in the invention. In FIGURE 3, the primary winding 10 is shown as surrounding the sensing winding 13 and bucking winding 14 so that the three windings 10, 13 and 14 are concentric in disposition. The innermost winding, the bucking winding 14, is seen to enclose a bore 50, which constitutes the bore of the magnet whose field is to be stabilized, and provides a common axis for the windings.

In FIGURE 4, there is shown in detail a partial sectional view of a solenoid 60 for use with the invention. The solenoid 60 of FIGURE 4 has a primary winding 10A of the type known as a Bitter solenoid. In this type of solenoid, the primary winding consists of a series of annular discs 61, separated from each other by insulators 62. Means (not shown) are provided to electrically connect the discs together in series. A sensing winding 13A consists of a helical winding of a wire 63 formed within a insulator 64. The wire 63 is a conventional electrical conductor having electrical insulation on its outer surface (not shown in FIGURE 4 for purposes of clarity). A bucking winding 14A consists of a plurality of layers of a helically wound rectangular strap 65 with conventional electrical insulation (not shown) separating adjacent turns.

FIGURE 5 is a partial sectional view of an alternate embodiment of a solenoid for use in the invention. A solenoid 70 has a primary winding 10B of the Bitter solenoid type. A bucking winding 14B consists of a plurality of layers of a round conductor 71, adjacent turns of which are separated by conventional electrical insulation (not shown). A sensing winding 13B consists of a helix formed by a triple winding of a conductor 72 disposed in the space formed between an insulator 64B and adjacent turns of the conductor 71.

In FIGURE 6, there is shown a partial sectional view of another embodiment of a solenoid for use with the present invention. In FIGURE 6, a solenoid 80 is shown as having a primary winding 10C formed by a plurality of layers of an electrical conductor 81 of circular cross-section. Conventional electrical insulation is utilized in the solenoid 80 to separate the windings and is now shown for purposes of clarity in FIGURE 6. A sensing winding 13C is shown as a triple winding of a conductor 82 of circular cross-section, formed so as to be helically disposed between adjacent turns of the conductor 81 within the primary winding 10C. A bucking winding 14C is a double winding of a single conductor 83, also disposed between the adjacent turns of the conductor 81.

Any of the winding configurations of the solenoids 60, 70, 80 of FIGURES 4, 5 and 6 can be utilized to form the solenoid illustrated in FIGURE 3. Thus, it is to be understood that the winding disposition illustrated in FIGURE 3 is an idealized configuration. However, the bucking, sensing, and primary windings in any embodiment of solenoid for use with the invention are preferably formed about a common axis; for example, the bore of an air core solenoid. Further, as is shown in FIGURE 3, the various windings are substantially equal in length as formed about the common axis, so as to be co-extensive, one with another. Optimum sensitivity and response result when the primary, sensing, and bucking windings are closely coupled with one another. This coupling, preferably, is substantially unity.

As has been indicated above, the amplifier circuit and bucking winding may be either single ended or push-pull in design. A single ended configuration is, however, preferable and, further, when utilizing a single ended configuration, it is preferable to connect the bucking winding in the amplifier output circuit so that the bucking field produced by the quiescent conduction of the amplifier augments, rather than subtracts from, the magnetic field produced by current flow through the primary winding. The actual current flow through the bucking winding then consists of a quiescent or D.C. component producing a magnetic field which augments the primary magnetic field and an A.C. component which tends to complement any change in the primary magnetic field. This A.C. component may be either additive or substractive, depending upon the sense of the variation in the primary field.

As was pointed out with respect to FIGURE 2, the overall high frequency response of the amplifier should be limited to frequencies less than that frequency of error signal which, when coupled to the amplifier as the control signal, causes the bucking winding to induce a positive, rather than a negative, feedback signal in the sensing winding, as a result of the phase shifting effect produced by the time delay inherent in the amplifier circuitry. When a transistorized amplifier is utilized, high speed transistors and D.C. coupling are, therefore, preferably used if the amplifier is to provide effective and rapid stabilization of even comparatively low frequency primary winding current variations.

The invention claimed is:

1. In a magnetic field stabilizer, the combination of:
    means for producing a primary magnetic field;
    a sensing winding;
    means coupling the sensing winding and the primary magnetic field so that a change in the magnitude of the primary magnetic field induces an error signal in the sensing winding;
    a bucking winding;
    means coupling the bucking winding and the primary magnetic field, whereby a current flow through the bucking winding produces a bucking magnetic field, and the magnetic field stabilizer has a total magnetic field which is the algebraic sum of the primary field and bucking field;
    means for controlling the flow of current through the bucking winding in response to the error signal so that, upon a change in the magnitude of the primary magnetic field, a complementary change in the bucking magnetic field is induced by current flowing in the bucking winding; and
    means coupling the bucking winding and the sensing winding so that a change in the current flow through the bucking winding induces a feedback signal in the sensing winding which opposes the error signal.

2. The combination of claim 1, and in which the means for producing the primary magnetic field comprises a primary air core winding across which an electrical potential is applied.

3. The combination of claim 2 and in which the primary sensing, and bucking windings are coupled together by being wound about a common axis.

4. The combination of claim 3 and in which the means for controlling the flow of current through the bucking winding comprises an amplifier having an input circuit and an output circuit, means for applying the error signal to the amplifier input circuit as an amplifier conduction control signal, and means connecting the bucking winding in the amplifier output circuit.

5. The combination of claim 4 and in which the amplifier is a normally conducting amplifier with a single-ended output circuit.

6. The combination of claim 5 and in which the bucking winding magnetic field augments the primary magnetic field, so that the magnitude of the total magnetic field exceeds the magnitude of the primary field.

7. The combination of claim 6 and in which the primary, sensing, and bucking windings are substantially equal in length as formed so as to be co-extensive with one another.

8. A magnetic field stabilizer comprising:
    an air core magnet having
        (a) a primary magnetic field winding,
        (b) a sensing winding, and
        (c) a bucking winding,
            said windings being closely coupled to one another;
    means for initiating the flow of electrical current through the primary winding to produce a primary magnetic field;
    an amplifier having an input circuit and an output circuit and in which a control signal applied to the input circuit controls electrical current conduction in the output circuit;

means connecting the sensing winding to the amplifier input circuit so that an error signal, which is induced in the sensing winding by a primary magnetic field change resulting from a change in the primary winding current, is coupled to the amplifier input circuit as the control signal;

means for producing a second magnetic field change complementary to the primary magnetic field change by connecting the bucking winding in the amplifier output circuit; and means operable in response to the second magnetic field change to induce a feedback signal in the sensing winding opposing the error signal.

9. A stabilizer according to claim 8, an in which the primary winding, sensing winding and bucking winding are formed about a common axis in a concentric disposition such that the primary winding encloses the sensing and bucking windings, and the sensing winding is disposed between the primary winding and the bucking winding.

10. A stabilizer according to claim 9, and in which the primary, sensing, and bucking windings are substantially co-extensive with one another.

11. A stabilizer according to claim 8, in which the amplifier has an inherent response time delay, and including means for limiting the overall high frequency response of the amplifier to frequencies less than that frequency which, when coupled to the amplifier input as the control signal, causes the second magnetic field change to induce a feedback signal in the sensing winding which augments the error signal.

12. A stabilizer according to claim 8, in which the amplifier is of a normally conducting, D.C. coupled, single-ended output type, the output circuit of which utilizes at least one high speed transistor, and in which the means connecting the bucking winding in the amplifier output circuit connects the bucking winding as the load impedance of said transistor.

13. Apparatus for stabilizing a magnetic field, the major portion of which is produced by a current flow through a primary winding, comprising:

a sensing winding;
a bucking winding;
said primary, sensing, and bucking windings being disposed in a concentric disposition about an air core and being formed co-extensive with one another, so as to be closely coupled to one another throughout their length;

a high speed transistor amplifier having an inherent response time delay resulting from transistor propagation delay time, an input circuit, and an output circuit normally conducting a quiescent circuit;

means connecting the bucking winding to the amplifier output circuit so that the quiescent current conducted in the amplifier output circuit flows in the bucking winding to produce a bucking winding magnetic field which augments the primary winding magnetic field;

means connecting the sensing winding to the amplifier input circuit so that an error signal, induced in the sensing winding by a change in the primary winding magnetic field resulting from a change in the primary winding current flow, is coupled to the amplifier input circuit as a control signal to change the conduction of the amplifier and thereby produce a change in the bucking winding magnetic field complementary to the change in the primary winding magnetic field; and means for inducing a feedback signal in the sensing winding which opposes the error signal induced in the sensing winding in response to the bucking winding magnetic field change, said means including high frequency response limiting means for limiting the high frequency response of the amplifier to frequencies below that frequency of error signal which, when applied to the amplifier input circuit, produces a bucking winding magnetic field change which induces a feedback signal in the sensing winding which augments the error signal as a result of the phase shifting effect of the amplifier inherent response time delay.

References Cited by the Examiner

UNITED STATES PATENTS

| | | | |
|---|---|---|---|
| 2,507,301 | 5/1950 | Fulbright | 317—123 |
| 2,735,044 | 2/1956 | Macleish | 317—123 |
| 2,787,737 | 4/1957 | Macleish | 317—123 |
| 2,979,641 | 4/1961 | Gunthard et al. | 317—123 |
| 3,080,507 | 3/1963 | Wickerham et al. | 317—123 |

MILTON O. HIRSHFIELD, *Primary Examiner.*

L. T. HIX, *Assistant Examiner.*